United States Patent [19]

Virgadamo

[11] Patent Number: 5,013,392
[45] Date of Patent: May 7, 1991

[54] THIN FILM DELAMINATION TOOL

[75] Inventor: Michael J. Virgadamo, Pasadena, Calif.

[73] Assignee: Hughes Aircraft Company, Los Angeles, Calif.

[21] Appl. No.: 480,419

[22] Filed: Feb. 15, 1990

[51] Int. Cl.$^5$ .............................................. B32B 31/18
[52] U.S. Cl. ..................................... 156/584; 30/169; 83/870; 156/254; 156/344
[58] Field of Search ........................... 30/169; 83/870; 156/254, 344, 584

[56] References Cited

U.S. PATENT DOCUMENTS

| | | | |
|---|---|---|---|
| 4,469,550 | 9/1984 | O'Steen, Jr. ..................... | 156/540 X |
| 4,625,611 | 12/1986 | Bauman ................................. | 83/861 |
| 4,654,923 | 4/1987 | Faciane et al. ................... | 30/169 X |
| 4,779,301 | 10/1988 | Millette ............................. | 30/169 X |
| 4,793,061 | 12/1988 | Rizzo, Jr. .............................. | 30/169 |
| 4,855,012 | 8/1989 | Sumi ................................. | 156/344 X |
| 4,898,058 | 2/1990 | Seifert ............................. | 156/584 X |

Primary Examiner—Michael W. Ball
Assistant Examiner—Mark A. Osele
Attorney, Agent, or Firm—Leonard A. Alkov; Wanda K. Denson-Low

[57] ABSTRACT

A hologram delamination tool is described in which a frame has a cutting blade fastened to one side thereof such that the blade is tautly disposed across a channel formed in the frame. A pressure plate is slidably inserted into the channel to hold the blade flat such that when the cutting tool is used to delaminate a hologram from a substrate, the pressure plate keeps the thin blade from buckling and is retracted during the cutting by the force of the edge of the delaminating hologram to allow the hologram to rest on the top surface of the blade so that the hologram can be lifted away from the substrate upon completion of the delamination.

14 Claims, 1 Drawing Sheet

THIN FILM DELAMINATION TOOL

BACKGROUND OF THE INVENTION

1. Field of the Invention

This invention relates to a tool for delaminating very thin layers and more particularly to a tool for delaminating holograms from substrates to which they are bonded.

2. Description of Related Art

The manufacture of holograms entails the use of materials which are sensitive to moisture and thus must be protected. Moreover, during exposure, the hologram must be held stationary to within a fraction of a wave length of the exposing light.

Thus, in practice, a material such as dichromated gelatine is laid down in a thin layer upon an ultra thin sheet of glass, typically 0.007 of an inch thick. This sheet of glass acts as a moisture shield for the finished hologram. The face of the glass opposite the gelatine layer is temporarily bonded to a relatively thick substrate with an adhesive such as UV curable photopolymers. With the hologram thus held stationary, it is exposed to a holographic beam to record a holographic image pattern in the gelatine. When the exposure is completed it is then necessary to remove the hologram comprising the layer of gelatine and the ultra thin layer of glass from the substrate. However, while the hologram is flexible, the glass tends to be very brittle and is easily cracked during such removal.

Heretofore the hologram has been manually removed by a skilled operator using a spatula-like blade of thin metal having a sharpened edge and a rounded corner. Typically this blade has been 0.002 of an inch thick. The operator thus worked the spatula into the bond line between the substrate and the glass to delaminate the hologram from the substrate by cracking the adhesive bond. This resulted in a chaotic cracking of the adhesive layer because of the non-uniform bonding strength of the adhesive. Moreover as the operator applied more pressure to the thin spatula blade, it tended to buckle thereby greatly increasing the chance that the thin glass would be cracked. Even skilled operators destroyed some of the holograms as a result of the cracking of the thin glass, especially during the initial debonding at the periphery of the hologram. On top of this, the delamination process was relatively slow, even for a skilled operator, which increased the probability that some moisture would be absorbed by the gelatine during this delamination step.

There has been an even greater probability of breaking the thin layer of glass when the gelatine has been etched back from the periphery of the micro glass as is the case when the gelatine is to be sealed from moisture when the hologram is installed in its ultimate end use such as a windshield. With the gelatine etched back from the periphery it no longer provides support for the thin glass during the initial debonding. Consequently even more of the holograms were destroyed, even by skilled operators, during the delamination step.

As a result, a hologram which was time consuming to produce was destroyed in one of the final processing steps.

SUMMARY OF THE INVENTION

In accordance with the embodiment described herein, a cutting tool is provided to delaminate thin brittle layers from a substrate by cracking the bond line of an adhesive layer. This is accomplished with a thin sharpened blade having a thickness on the order of the thickness of the adhesive layer. The advantages of this cutting tool are that the blade is kept from buckling during the initial cutting stage which allows for a relatively even pressure on the bond line. Moreover as the blade slices under the holographic laminate of glass and gelatine and cracks the bond line the hologram is retained on top of the cutting blade for subsequent removal from the substrate.

Advantages of this tool are that less operator skill and training is required to remove the hologram, and better success rates are achieved in that fewer fractures occur during the delamination step than with the prior procedures. Moreover, delamination using the tool is faster thereby reducing the problems associated with the gelatine's susceptibility to moisture.

These advantages are accomplished with a cutting tool having a thin blade fastened to the bottom of a frame. The blade is tautly disposed across a channel in the frame. A pressure plate is slidably inserted within this channel and keeps the thin blade from buckling during the initial cutting stage. As cutting progresses, the pressure plate is slidably retracted rearward through the channel thus allowing the holographic laminate to lay upon the trailing top surface of the cutting blade which assists in lifting the hologram following delamination. This retraction of the pressure plate can be done either manually by the operator or by the force of the leading edge of the delaminated hologram against the leading edge of the pressure plate during the cutting step.

DESCRIPTION OF THE PREFERRED EMBODIMENT

Figure 1:
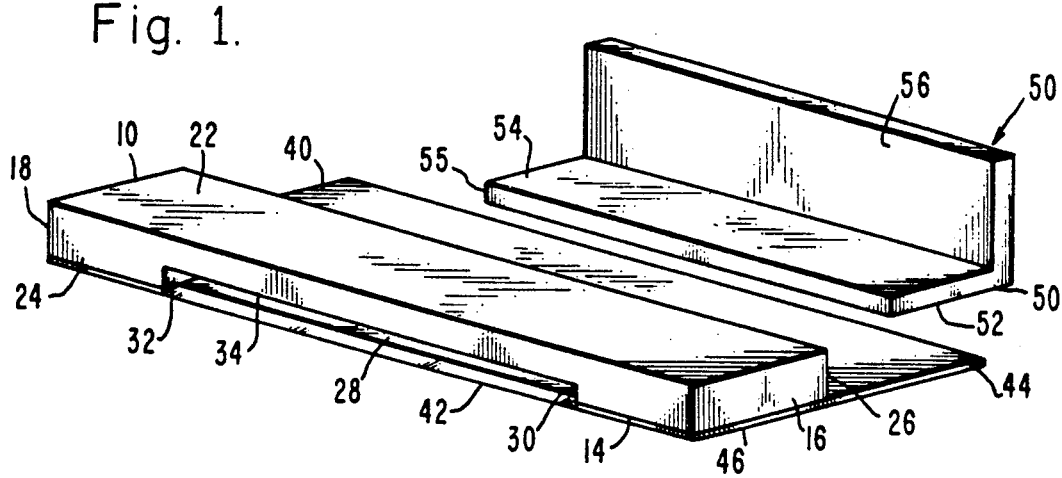
FIG. 1 is a perspective view of the cutting tool showing a pressure plate fully withdrawn from the channel of a frame.

Referring now to the drawings in more detail, FIG. 1 illustrates in perspective view, a cutting tool which includes a frame 10. The frame 10 is illustrated in a rectilinear block configuration and has a cutting surface 14 at the lower surface thereof, two side walls 16 and 18, and a top wall 22. Also illustrated is a leading edge wall 24, and a trailing edge wall 26.

Formed through the lower portion of the frame 10 is a channel 28 with one side thereof open to the cutting surface 14. This channel 28 is generally rectilinear with side walls 30 and 32 and a top wall 34 and is dimensioned to receive a hologram as will be explained in more detail later. It should, of course, be understood that while the frame 10 and channel 28 are illustrated in a rectilinear configuration, it is not necessary that they have this configuration.

A blade 40, preferably of stainless steel or other material capable of holding a sharpened edge, is disposed to tautly extend across the channel 28 and is fastened to the cutting plane surface 14 of the frame 10 at the cleats formed between the side walls 30 and 32 of the channel 28 and the side walls 16 and 18 of the frame 10. This fastening can be accomplished by means of an adhesive or by double backed adhesive tape 46. Another approach (not shown) would be to have projections extending from the cutting plane surface 14 and matching apertures formed in the blade 40 to keep it tautly in place.

The leading edge of blade 40 is sharpened at 42 while the trailing top surface platform or skirt 44 projects beyond the trailing edge 16 of the frame 10 to form a long top surface or platform. The sharpened leading edge is preferably beveled only on the upper surface thereof so that the knife edge cutting point will be pushed into operable contact with the cutting surface of a substrate during the delamination operation to be described later. This cutting blade 40 is thin having a thickness somewhere around the thickness of the bond line of an adhesive to be severed and delaminated. Typically this thickness can be 0.002 of an inch. It should be noted that while the flexible blade 40 is illustrated as being planar it could be curvilinear if such were the contour of the hologram.

Figure 2:
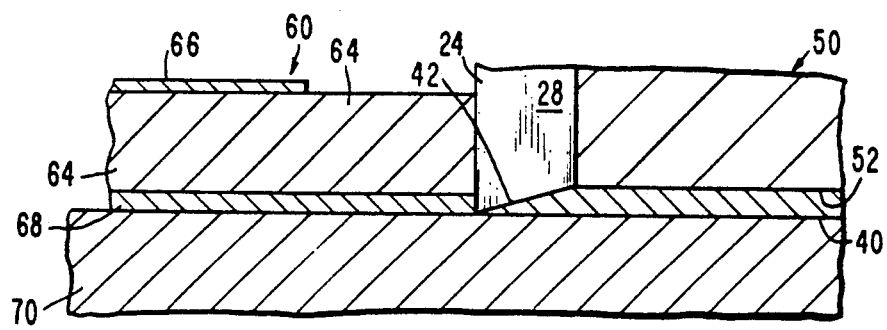
FIG. 2 is an enlarged scale side elevation in cross section illustrating the relationship of the cutting tool to a holographic laminae bonded to a substrate just prior to the delamination step.

The cutting tool illustrated in FIG. 1 further includes a pressure plate 50 shown as fully extracted from the channel 28 in the frame 10. This pressure plate 50 is dimensioned to freely slide and snugly fit within the channel 28 thereby forming a solid surface against the upper surface of blade 40 which prevents the blade 40 from buckling upward during the delamination operation. Structurally, the pressure plate 50 includes a cutting surface wall 52 which is in intimate contact with the top surface 44 of the blade 40. Also included are a top surface 54 which abuts the top wall 34 of channel 28 to prevent any significant upward movement of the pressure plate 50. The leading edge wall 55 is dimensioned so that it extends to about the bevel on the leading edge 42 of the blade 40 when the pressure plate 50 is fully inserted into the channel 28 as illustrated in FIG. 2. When the pressure plate 50 is fully inserted the upwardly projecting stop wall 56 of the pressure plate abuts the trailing edge wall 26 of the frame 10 to prevent further insertion of the pressure plate 50.

Figure 3:
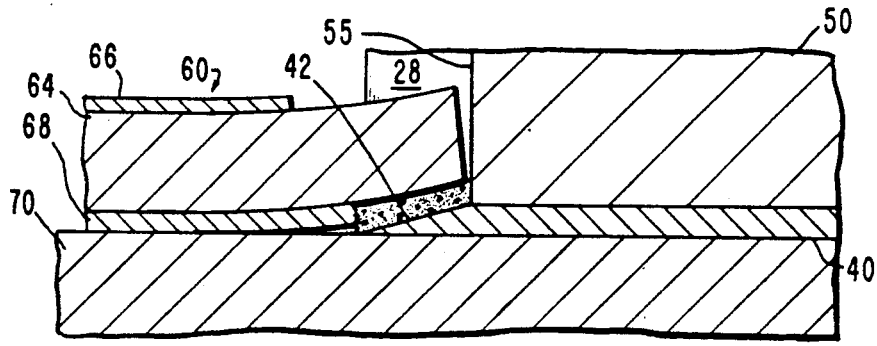
FIG. 3 is a side elevation in cross section illustrating the delamination of the hologram by the cutting tool during the initial stages of the delamination step.
Figure 4:
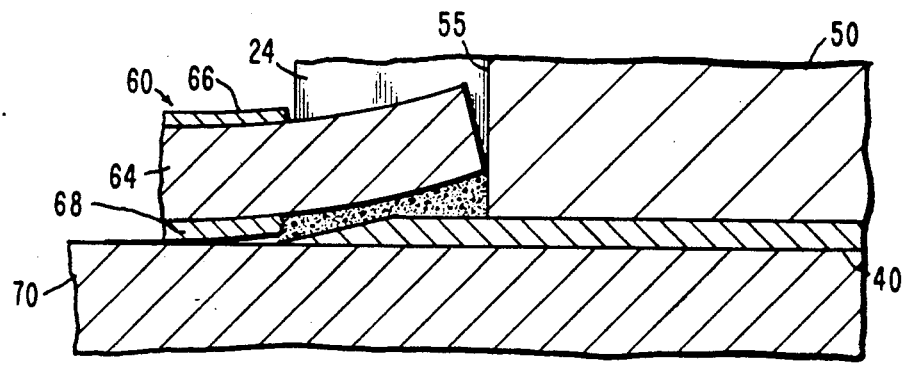
FIG. 4 is a side elevation cross sectional view illustrating the further delamination of the hologram from the substrate and slidable retraction of the pressure plate from the frame.

As illustrated in the enlarged scale cross sections of FIGS. 2 through 4, a hologram 60 is provided. This hologram 60 includes a micro glass layer 64 and a layer of emulsion 66 such as dichromated gelatine adhered to the top surface of the micro glass 64 and etched back from the edge of the microglass. The layer of emulsion can, for example, be 0.0005 of an inch thick. The glass layer 64 can, for example, be from 0.003 of an inch to 0.012 of an inch thick and is preferably 0.007 of an inch thick. When the hologram 60 is finally installed, such as on a vehicle windshield, the emulsion layer 66 will abut the windshield (not shown) and the glass layer 64 acts as a moisture shield to prevent moisture from reaching the moisture sensitive gelatine.

A layer of adhesive 68 temporarily bonds the surface of the glass 64 which is opposite the layer of gelatine 66 to a rigid stable substrate 70. This adhesive can be a photopolymer which is sensitive to ultraviolet light for curing. One adhesive which has proved effective is "Master Bond" type 4 ML UV curable made by Master Bond Company. Of course, it should be understood that the specific adhesive used is not critical to the invention other than that it preferably fractures or delaminates under the pressure of the cutting blade 40 and that it have low adhesive strength for forcible delamination. This layer of adhesive 68 may typically be 0.001 of an inch thick. This thickness could of course be more or possibly less.

As is best illustrated in the sequence of steps in FIGS. 2 through 4, the cutting tool is moved into position with the lower surface of blade 40 in intimate contact with the exposed upper surface of the substrate 70 until the sharpened leading knife edge 42 comes into contact with the periphery of the adhesive layer 68. As illustrated in FIG. 3 the cutting tool is then pushed forward such that the leading edge 42 enters into the adhesive layer 68 thereby cracking the bond line of the adhesive and starting the initial delamination glass layer 64 of the hologram 60 from the substrate 70.

As the delamination continues beyond the stage illustrated in FIG. 3, with the periphery of the hologram 60 touching the leading wall 55 of the pressure plate 50, the edge of the hologram 60 easily pushes the pressure plate 50 rearward through channel 28 as illustrated in FIG. 4. This results in the pressure plate 50 being slidably extracted out through the trailing edge of channel 28 from the frame 10. At the same time the cutting edge 42 continues to chaotically crack, and shatter the adhesive layer 68 thereby further delaminating the hologram 60 from the substrate 70. As cutting progresses further beyond the stages shown in FIG. 4, the hologram 60 is eventually separated from the substrate 70 by the blade 40, and the separated hologram 60 is positioned on the top surface platform 44 of the blade 40. This thereby enables the hologram (which is brittle, but flexible) to be lifted clear of the substrate 70 on the platform 44. Consequently, there is a reduced probability of damage to the hologram 60 when it is lifted off of the substrate 70.

While salient features have been described with respect to a particular embodiment, many variations and modifications can be made without departing from the scope of the invention. Accordingly, that scope is intended to be limited only by the scope of the appended claims.

What is claimed is:

1. A tool for delaminating a hologram having a protective layer of glass from a substrate to which the layer of glass is bonded by a layer of adhesive comprising:
 a frame having a cutting surface and a channel formed through said frame said channel being open to said cutting surface;
 a metal blade secured to the cutting surface and disposed to extend across the channel, said blade having a leading edge which is sharpened and a lower surface which is operable to travel along the substrate; and
 a pressure plate operable to slidably fit within the channel of said frame and contact said blade for keeping said blade from buckling toward said frame, whereby said pressure plate is operably extracted from the channel as said blade is moved along the substrate and inserted into the layer of adhesive during delamination of the hologram from the substrate.

2. The tool for delamination of claim 1 in which said cutting surface of said frame and said metal blade are in a plane and said blade is tautly disposed across said channel.

3. The tool for delaminating a hologram of claim 1 in which said blade has a thickness of about the same thickness as the layer of adhesive bonding the layer of glass to the substrate.

4. The tool for delaminating a hologram of claim 1 in which said leading edge of said blade is sharpened with a bias angle only on the side away from the cutting surface which is operable to travel along the substrate.

5. The tool for delaminating a hologram of claim 1 in which said blade has a trailing upper surface which extends beyond an edge of said frame to form a platform whereby said blade is operable to lift the hologram from the substrate after delamination.

6. The tool for delaminating a hologram of claim 1 in which said leading edge of said metal blade is disposed to extend to about a boundary of a leading edge of said frame and a leading edge of said pressure plate is operable to extend up to about a bias cut angle of said blade when said pressure plate is fully inserted into said channel.

7. The tool for delaminating a hologram of claim 1 in which said pressure plate is configured to snugly fit within said channel and to allow free sliding extraction from said channel during delamination of the hologram.

8. The tool for delaminating a hologram of claim 1 in which said channel is dimensioned to a size which allows the delaminated hologram to pass through said channel.

9. The tool for delaminating a hologram of claim 2 in which said blade is flexible and has a thickness of about the same thickness as the layer of adhesive bonding the layer of glass to the substrate.

10. The tool for delaminating a hologram of claim 9 in which said leading edge of said blade is sharpened with a bias angle only on the side away from the cutting surface which is operable to travel along the substrate.

11. The tool for delaminating a hologram of claim 10 in which said blade has a trailing upper surface which extends beyond an edge of said frame whereby said blade is operable to lift the hologram from the substrate after delamination.

12. The tool for delaminating a hologram of claim 9 in which said leading edge of said metal blade is disposed to extend to about a boundary of a leading edge of said frame and said pressure plate has a stop member so that a leading edge of said pressure plate is operable to extend up to about a bias cut angle of said blade when said pressure plate is fully inserted into said channel.

13. The tool for delaminating a hologram of claim 12 in which said pressure plate is configured to snugly fit within said channel and to allow free sliding extraction from said channel during delamination of the hologram.

14. The tool for delaminating a hologram of claim 13 in which said channel is dimensioned to a size which allows the delaminated hologram to pass through said channel.

* * * * *